United States Patent
Wong

(10) Patent No.: US 9,407,430 B1
(45) Date of Patent: Aug. 2, 2016

(54) CARRIER FREQUENCY SYNCHRONIZATION OF DATA

(71) Applicant: Northrop Grumman Systems Corporation, Falls Church, VA (US)

(72) Inventor: Mark B. Wong, Bellflower, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 14/747,510

(22) Filed: Jun. 23, 2015

(51) Int. Cl.
| | |
|---|---|
| H04L 7/04 | (2006.01) |
| H04L 27/00 | (2006.01) |
| H04L 1/00 | (2006.01) |
| H04L 7/033 | (2006.01) |
| H04L 7/10 | (2006.01) |
| H04L 27/26 | (2006.01) |

(52) U.S. Cl.
CPC ............... H04L 7/048 (2013.01); H04L 1/0005 (2013.01); H04L 7/0331 (2013.01); H04L 7/10 (2013.01); H04L 27/0008 (2013.01); H04L 27/266 (2013.01); H04L 27/2659 (2013.01); H04L 2027/0081 (2013.01)

(58) Field of Classification Search
CPC ............... H04L 27/3827; H04L 27/066; H04L 27/2275; H04L 27/2659; H04L 27/266; H04L 2027/0071; H04L 7/04; H04L 7/048; H04L 7/10; H04L 2027/0081; H04L 7/0331; H04L 27/0008; H04L 1/0005; H03M 13/52
See application file for complete search history.

(56) References Cited

U.S. PATENT DOCUMENTS

| | | | |
|---|---|---|---|
| 7,161,956 B2 | 1/2007 | Gollamudi et al. | |
| 7,237,178 B1* | 6/2007 | Sutardja | G11B 20/18 714/770 |
| 7,369,633 B2* | 5/2008 | Jiang | H04L 7/048 370/503 |
| 7,443,920 B2 | 10/2008 | Thesling et al. | |
| 7,529,321 B1* | 5/2009 | Shiraishi | H04H 20/74 375/329 |

(Continued)

OTHER PUBLICATIONS

Oh, J.G. et al; An alternative Carrier frequency Synchronization scheme for DVB-S2 systems; Advanced Communication Technology (ICACT), 2010 The 12th International Conference on, vol. 1; pp. 529-533, Feb. 7-10, 2010.

(Continued)

*Primary Examiner* — Chieh M Fan
*Assistant Examiner* — Michelle M Koeth
(74) *Attorney, Agent, or Firm* — Patti & Malvone Law Group, LLC

(57) ABSTRACT

An exemplary method is implemented by a radio frequency receiver for synchronizing the recovery of data carried by frames. An indication is generated from error correction of whether the error control coding in the receiver is capable of correcting all the errors induced by the channel within the frame. If the indication declares that all the errors are corrected, then the carrier frequency estimate associated with the error free frame is saved in memory and will be used to initialize the carrier recovery loop at the beginning of the following frames until such frequency estimate is declared unreliable. A new carrier frequency estimate is available at the end of each frame, and if such estimate is proven to be reliable for future use, the current estimate in memory will be overwritten by the new estimate and the freshness of the frequency estimate is extended.

10 Claims, 4 Drawing Sheets

(56) References Cited

U.S. PATENT DOCUMENTS

| | | | |
|---|---|---|---|
| 7,746,760 | B2 | 6/2010 | Vijayan et al. |
| 2004/0247022 | A1* | 12/2004 | Raghavan ............ H04B 3/32 375/219 |
| 2007/0033507 | A1* | 2/2007 | Jiang ............ H03M 13/6306 714/785 |
| 2010/0159861 | A1* | 6/2010 | Becker ............ H04L 7/0029 455/205 |
| 2012/0224657 | A1* | 9/2012 | Sasaki ............ H04L 27/2273 375/326 |
| 2013/0223320 | A1 | 8/2013 | Becker et al. |

OTHER PUBLICATIONS

Gong, F. et al; Initial-Estimation-Based Adaptive Carrier Recovery Scheme for DVB-S2 System; Broadcasting, IEEE Transactions on, vol. 58, No. 4; pp. 654-659; Dec. 2012.

Howlader, M. M K et al; Decoder-assisted frame synchronization for packet transmission; Selected Areas in Communications, IEEE Journal on, vol. 19, No. 12; pp. 2331-2345; Dec. 2001.

Rosati, S. et al; Joint Symbol Timing and Carrier Frequency Recovery for DVB-SH System; Satellite and Space Communications, 2007; IWSSC '07; International Workshop on, pp. 79-83; Sep. 13-14, 2007.

Villanti, M. et al; On the design of a common avenue for frequency estimation and frame synchronization; Wireless Communications and Networking Conference, 2006; WCNC 2006, IEEE, vol. 3; pp. 1455-1460; Apr. 3-6, 2006.

Boutillon, E. et al; Efficient multiplierless architecture for frame synchronization in DVB-S2 standard; Signal Processing Systems (SiPS); 2011 IEEE Workshop on, pp. 163-167; Oct. 4-7, 2011.

* cited by examiner

CARRIER FREQUENCY SYNCHRONIZATION OF DATA

STATEMENT REGARDING FEDERALLY SPONSORED RESEARCH OR DEVELOPMENT

The Government of the United States of America has rights in this invention pursuant to Government Contract No. 09-C-4138.

BACKGROUND

This invention relates to the recovery of data received by a radio frequency (RF) communication. More specifically, the invention is directed to the acquisition of synchronization for received RF frames of data and is especially, but not exclusively, suited for synchronization of data transmitted in frames of variable data rate, e.g. frames with data encoded by variable coding and modulation (VCM).

Various types of RF communication systems exist. In a known RF system, the data to be conveyed is carried by the transmission of a plurality of consecutive frames where each frame contains a header and a payload, where each payload contains a segment of the data. A preamble is typically transmitted as part of the header as an aid to determining synchronization by a receiver. In view of overhead efficiency and maximizing data throughput, the number of bytes in the preamble should be small. In RF environments where the signal-to-noise ratio (SNR) is low or is at least periodically low at the receiver, VCM is useful since the modulation rate can be changed from frame to frame based on the SNR and the resulting reliability of data recovery. When the RF communication channel has a high SNR, a modulation technique can be utilized to convey a high data throughput; conversely, when the RF communication channel has a low SNR, the modulation technique can be adjusted to convey a lower data throughput, thus maximizing the amount of reliable data throughput dependent on the RF communication channel SNR.

While VCM and other variable length frame/modulation techniques are useful in maximizing data throughput, it creates a challenge at the receiver in recovering the correct carrier frequency/timing for decoding the data carried by each frame, especially for RF environments with low SNR, since each frame may use a different modulation technique and/or independent lengths. For example, the number and/or type of symbols carrying data in the payload of one frame may differ from the number/type of symbols carrying data in the payload of a following frame. Therefore, there exists a need for improvements in acquiring and maintaining synchronization for data recovery, and especially in such systems.

SUMMARY

It is an object of the present invention to satisfy this need.

An exemplary method is implemented by a radio frequency receiver for synchronizing the recovery of data carried by frames received by a radio frequency communication. A first carrier frequency estimate is used to establish synchronization with the preamble data to identify each data unit contained in a first frame. An indication is generated, from error correction applied to the identified data units of the first frame, of whether all the errors contained in the data units within the frame are correctable by the error correction decoder. If the indication represents that all the errors within the frame are correctable, the first carrier frequency is saved in memory and used for synchronization of data contained in a predetermined number of subsequent frames regardless of other carrier frequency information associated with the subsequent frames.

A radio frequency receiver suited for implementing this method represents another embodiment of the present invention.

DESCRIPTION OF THE DRAWINGS

Features of exemplary implementations of the invention will become apparent from the description, the claims, and the accompanying drawings in which:

DETAILED DESCRIPTION

One aspect of the present invention resides in the recognition of the difficulties in making decisions of what carrier frequency/timing determination should be used to recover data carried in the payload of successive frames, especially but not exclusively, where a VCM system is utilized. It was recognized that information from error correction of data recovered during a prior frame could be advantageously incorporated as part of the carrier frequency/timing estimate decision for following frames. As used herein "carrier frequency" refers to a receiver generated signal having a frequency used to coincide with the rate at which the data units in the data are received supporting the parsing of the data into separate data units (bytes or groups of bytes) for further processing.

Figure 1:
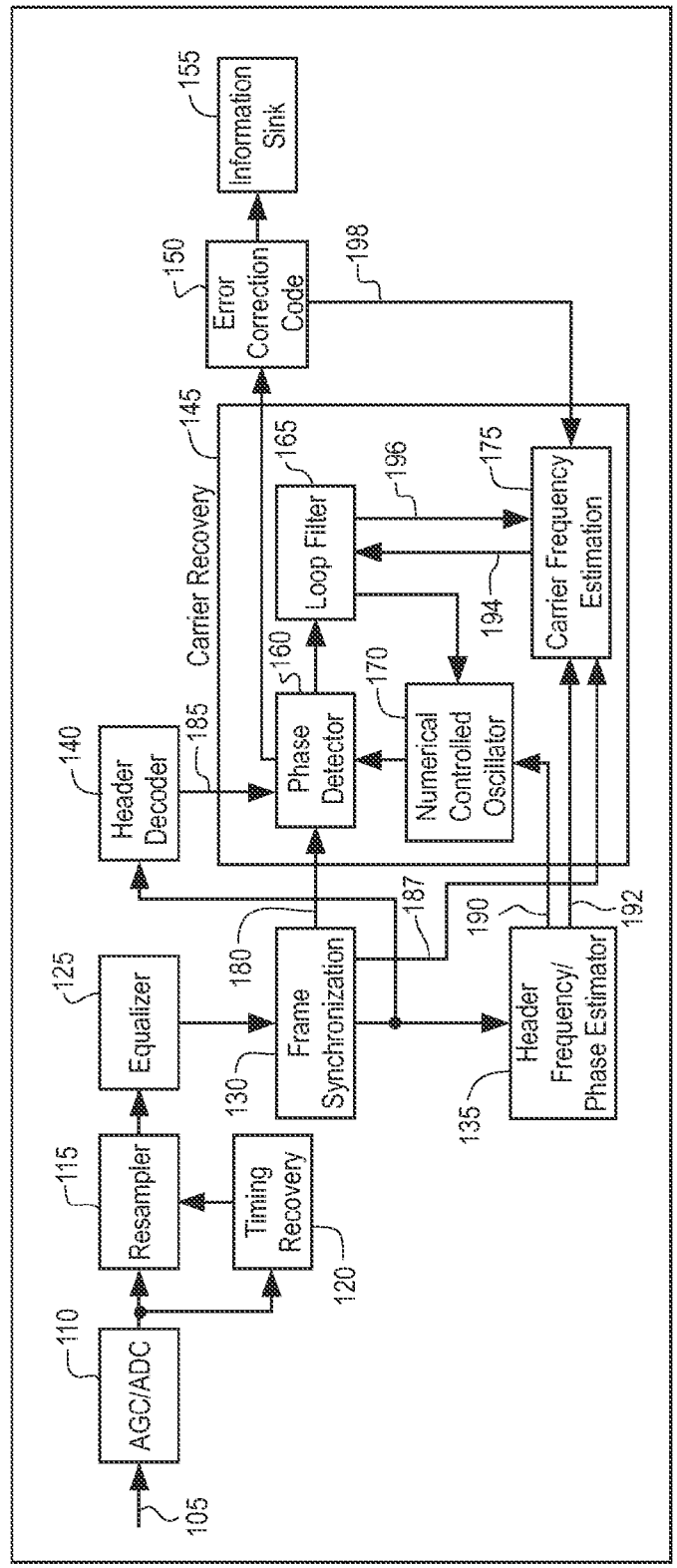
FIG. 1 is an exemplary block diagram of a receiver in accordance with an embodiment of the present invention.

FIG. 1 is a block diagram of an exemplary receiver 100 suited for carrying out the exemplary methods of the present invention. An RF input signal 105 is an input to the Automatic Gain Control/Analog-To-Digital Converter (AGC/ADC) 110 which provides automatic gain control and converts the received analog input RF signal into a digital output. This digital output forms an input to the Resampler 115 and the Timing Recovery 120. As will be appreciated by those skilled in the art, the purpose of the Resample and Timing Recovery are to organize the input digital data stream into a fixed number of samples per symbol and provide this organized data stream as an input to the Equalizer 125 which provides distortion correction and decimation of the signal to 1 sample per symbol. The output from Equalizer 125 is provided as an input to the Frame Synchronization 130 which serves to determine frame boundaries associated with the received digital data stream. One output from the Frame Synchronization 130 is header data which is provided as an input to the Header Frequency/Phase Estimator 135 and to the Header Decoder 140. As the name implies, the purpose of element 135 is to use the header data to determine both carrier frequency offset and phase estimate. The purpose of the Header Decoder 140 is to determine the modulation format utilized in the following frame based on information contained in the header along with other information that could be embedded within the header depending on frame definitions. The outputs from elements 135 and 140 are provided as inputs to the Carrier Recovery module 145 which will be explained in more detail below.

The Frame Synchronization 130 provides an output of the payload data of the frame and the location of the frame boundary to the Carrier Recovery module 145. The data from the payload data input as recovered by the Carrier Recovery module 145 is provided as an output to the Error Correction Code module 150 which applies an error correction code, e.g. the known Bose-Chaudhuri-Hocquenghem (BCH) error correction code. The error corrected data is provided as an input to the Information Sink 155 which represents an input for a utilization of the recovered data. The Error Correction Code module 150 also provides an output to the Carrier Recovery module 145 indicating whether or not all the errors within the frame are correctable.

The Carrier Recovery module 145 extracts the payload data within a frame to be provided to the Error Correction Code 150. The exemplary Carrier Recovery module 145 includes a digital phase locked loop (DPLL) including Phase Detector 160, Loop Filter 165, and Numerical Controlled Oscillator 170. The operation of a PLL is generally known, however the control of the operation of the PLL based on the determinations made in accordance with exemplary methods of the present invention provides improved carrier frequency estimate initialization on a frame by frame basis. Also included in the Carrier Recovery module 145 is a Carrier Frequency Estimation module 175 which implements logic described in more detail below associated with the exemplary methods of the present invention.

An input 185 to the Phase Detector 160 from the Header Decoder 140 defines the modulation format associated with the following frame so that the phase detector can adjust to a new modulation format when there is a switch. The Carrier Frequency Estimation module 175 receives an input 187 from the Frame Synchronization module 130 that determines the frame boundary of the input. An input 190 to the Numerical Controlled Oscillator (NCO) 170 from Header Frequency/Phase Estimator module 135 carries the carrier phase estimate of the input signal computed by the header symbols and the phase information is then fed to the NCO. An input 192 to the Carrier Frequency Estimation module 175 from the Header Frequency/Phase Estimator module 135 carries the carrier frequency estimate using with the header symbols. Loop Filter 165 receives an input 194 from the Carrier Frequency Estimation module 175 indicating the carrier frequency estimate to be utilized. The Carrier Frequency Estimation module 175 receives an input 196 from the Loop Filter 165 indicating the carrier frequency state within the DPLL at the end of each frame and an input 198 from the Error Correction Code module 150 indicating for the processed data of the frame whether any errors were detected after forward error corrections.

Figure 2:
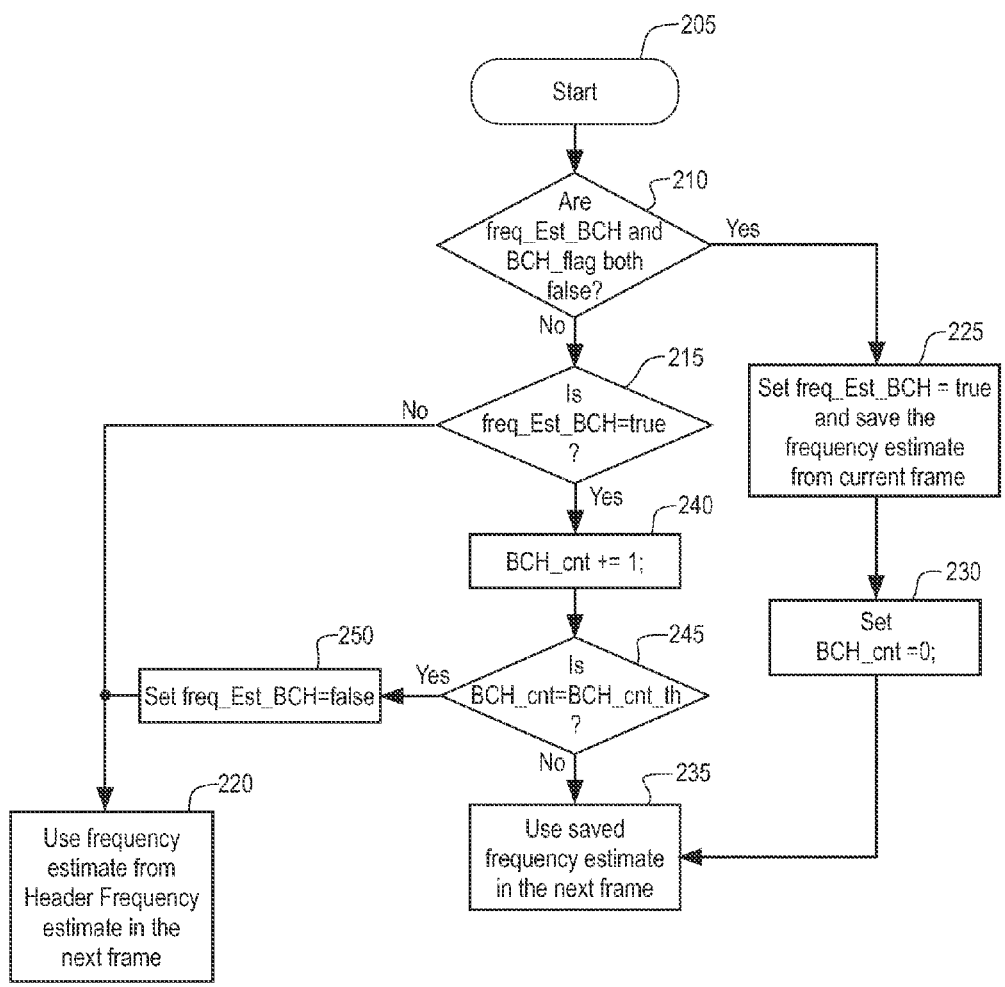
FIG. 2 is a flow diagram of an exemplary method in accordance with the present invention.

FIG. 2 is a flow diagram of exemplary steps in accordance with an embodiment of a method of the present invention. It is believed that a general description before beginning description of the specific steps will provide an overview that will assist in understanding the specific steps. In accordance with this method, the use of an error correction capability of the receiver is utilized to decide whether or not the carrier/timing estimate from a previous frame should be used to initialize the tracking loop for carrier/timing recovery in the next frame. If the error correction decoder does not decode an entire frame of data without any errors, the synchronization may not have been achieved during the subject frame. In that case, the receiver should not save the carrier/timing estimate for use as the carrier/timing for the next frame. If the error correction module decodes an entire frame of data without any error, this indicates a high probability that synchronization was achieved during that frame. In that case, the carrier/timing estimate used for that frame will be saved and used for a predetermined number of following frames until the current estimate is overwritten by a more recent estimate. However, if the saved carrier/timing estimate becomes stale, i.e. the predetermined number of frames is reached, then the saved carrier/timing estimate will be discarded and a new carrier/timing estimate derived from the header of the current frame will be used. The method as shown in FIG. 2 is suited for use in a VCM system in which frames are periodically decoded on a regular basis without any errors, e.g. frames may be periodically transmitted with lower order modulation (fewer bits per symbol in the payload within a frame) so that there will be a much higher probability that this payload of data can be decoded without any errors, which allows the carrier frequency estimate to be refreshed periodically.

In FIG. 2, START 205 indicates the beginning of a series of steps in accordance with an exemplary method that are executed for each received frame. In step 210 a determination is made of whether freq_est_BCH (initial value false) is false. Freq_est_BCH is a flag that is set to true upon the processing of a frame of data in which all the errors within a frame were correctable by the error correction module. BCH_flag represents a failure flag set to true by the error correction module representing that all the errors within the payload data of a frame cannot be corrected by the error correction module; a false condition indicates that all the errors within a frame are correctable by error correction module. A YES determination by step 210 represents that a frequency estimate (carrier/timing estimate) from the current frame is reliable and can be used to replace the previous frequency estimate for initializing the frequency component of the digital phase locked loop in the next frame. If all the errors within a frame are correctable, then the carrier frequency estimate is deemed sufficiently reliable for reuse in the subsequent frames until the estimate becomes stale. In step 225 the freq_est_BCH flag is set to true and the corresponding frequency estimate for the current frame (BCHfreq_save) is saved for subsequent use in following frames. In step 230 the BCH_cnt (a counter) is set to zero. The value of this counter operates in combination with a corresponding threshold count value to determine staleness of the frequency estimate BCHfreq_save. Setting this counter to zero indicates there is a new frequency estimate available and it can be used for the number of frames defined by BCH_cnt_th frames. Bch_cnt_th_frames is set to the number of frames a frequency estimate can be reused before it becomes stale. Those skilled in the art will appreciate that other initial and corresponding threshold values could be used. In step 235 the frequency estimate associated with BCHfreq_save is set to be utilized by the PLL for synchronization of the next frame.

A NO determination in step 210 will occur on an initial startup since BCH_flag is set with an initial value of true. This NO determination will also be made after the predetermined number of frames following freq_est_BCH being set to true. On a NO determination by step 210, a determination is made by step 215 of whether the freq_est_BCH is true. A NO determination by step 215, indicating that a frequency estimate saved in memory from the past error free frame is not available, results in step 220 causing the use of a frequency estimate derived from the header preamble of the frame from input 192 of element 135 to be used for the next frame.

A YES determination by step 215 results in step 240 causing BCH_cnt counter to be incremented by one, i.e. advancing towards a threshold which will signify staleness of the currently saved frequency estimate. A determination is made in step 245 of whether the BCH_cnt has reached a corresponding threshold value (BCH_cnt_th). A NO determination by step 245, indicating that staleness has not yet been reached, results in step 235 causing the frequency estimate associated with BCHfreq_save to be utilized for the next frame. A YES determination by step 245 results in step 250 causing the freq_est_BCH flag to be set to false, i.e. after a substantial number of frames in which the frequency estimate associated with the BCHfreq_save has been used the frequency estimate is due for updating. Following step 250, step 220 as previously explained is executed.

Figure 3:
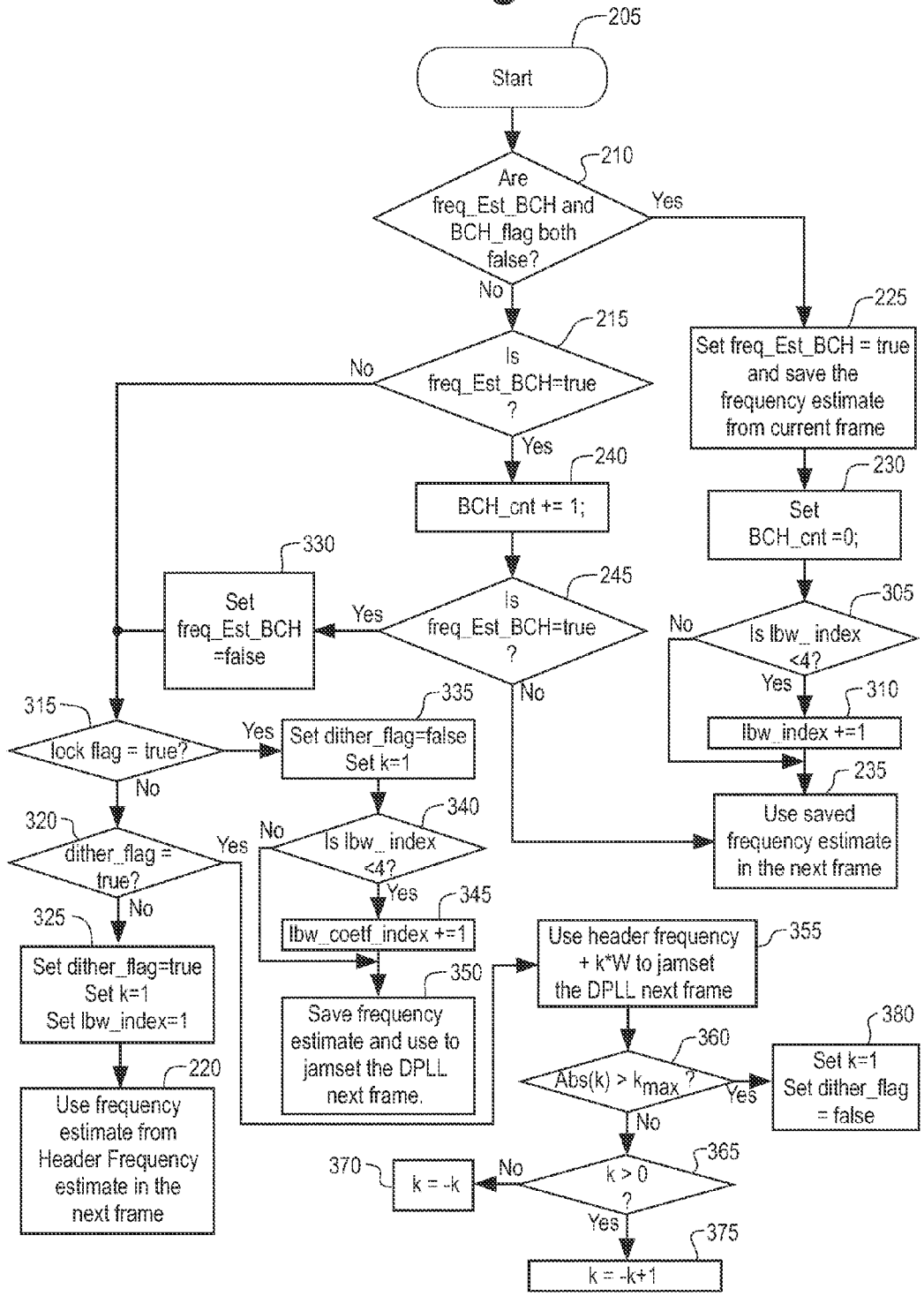
FIG. 3 is a flow diagram of another exemplary method in accordance with the present invention.

FIG. 3 is a flow diagram of another embodiment of a method in accordance with the present invention implemented for each received frame. This method has substantial similarities to that described with regard to FIG. 2 and hence steps in FIG. 3 that are the same or substantially the same as steps in FIG. 2 have the same reference numerals as corresponding steps in FIG. 2. This method further includes controlling the loop filter bandwidth of the PLL to help achieve a more rapid lock of the PLL. Additionally, should the frequency estimate based on frequency information derived from the header preamble of the frames contain a bias (frequency offset) that adversely impacts PLL lock, this method provides a dithering technique to account for such a bias by trying alternating frequency offset amounts to find a frequency estimate that will bring the PLL into lock.

Referring to FIG. 3, a YES determination by step 210 continues with steps 225 and 230 as previously explained with regard to FIG. 2. Following step 230, step 305 makes a determination if the lbw_index is less than 4, where lbw_index corresponds to a loop filter bandwidth parameter with exemplary values ranging from 1-4 and where each of these values corresponds to a predetermined bandwidth with lbw_index=1 corresponding to the largest frequency bandwidth and lbw_index=4 corresponding to the narrowest, normal operating frequency bandwidth of the loop filter of the PLL used while the PLL is locked. A NO determination by step 305, indicating that the loop filter is operating in its narrowest, normal operating locked bandwidth (lbw_index=4), results in the execution of step 235. A YES determination by step 305, indicating that the loop filter is operating at a bandwidth broader than its normal locked operating bandwidth, results in lbw_index being incremented by one thereby causing a step reduction in the bandwidth of the loop filter.

Still referring to FIG. 3, following a NO determination by step 210, a YES determination by step 215, execution of step 240, and a NO determination by step 245, step 235 will be executed as previously explained. Because freq_est_BCH flag was true as determined by step 215, this indicates that a frame contains more errors than the capability of the error correction module can correct but still within the staleness threshold and hence the PLL can still be initialized by the frequency estimate from memory at the beginning of the frame.

Still referring to FIG. 3, a NO determination by step 215 could be the result of an initial startup, i.e. there is no previously saved frequency estimate from a prior frame. During such a condition the PLL needs to be initialized by a less reliable source which is the frequency estimate derived from the header preamble until an error free frame when error correction is applied is found. In step 315 a determination is made of whether the lock_flag indicates the PLL is phase locked. This is based on the computation of the phase detector error variance of the PLL being below a predefined threshold value, for which condition the lock_flag will be set to true. A NO determination by step 315, indicates that the phase detector error variance within the PLL is larger than the predefined threshold value, results in step 320 making a determination of whether the dither_flag is true, where the dither_flag being true results in the currently used frequency estimate being alternately adjusted up in frequency for one frame and down in frequency for a next frame (dithered) in an effort to find a frequency that will result in lock of the PLL. Following a NO determination by step 320, step 325 sets the dither_flag to true; a dither index K is set equal to 1; and the lbw_index is set equal to 1 which corresponds to the broadest bandwidth of the loop filter which assists in rapid convergence of the PLL into lock. Next, step 220 is executed.

Another way to reach step 315 is by a YES determination by steps 215 and 245. This path represents that too many frames have gone by without an error free frame indicated by the error correction module. Therefore, step 245 determines this estimate to be stale and requires a reacquisition of a frequency estimate. Step 330 is the same as step 250 in that the freq_est_BCH is set to false. Following step 330, the process continues with the execution of step 315.

Following a YES determination by step 315, the lock_flag being true indicating that the PLL is in phase lock, the dither_flag is set to false and K is set equal to 1 in step 335. Because the PLL is in lock, there is no reason to initiate dithering which is only used as part of the process for achieving PLL phase lock. Step 340 and 345 function the same as previously explained steps 305 and 310. In step 350 the frequency estimate is saved for use to jam set into the PLL frequency offset component on the next frame, i.e. the PLL is forced to use this frequency estimate for the next frame.

Following a YES determination by step 320 (indicating the PLL is not in phase lock and the dither flag is set to true), in step 355 the PLL is forced on the next frame to use a frequency equal to the header preamble frequency+k*W, where k is a variable positive integer having an initial value of one and a predetermined maximum value, and W is a predetermined offset frequency amount to be used in the dithering technique to change the PLL frequency by plus and minus increasing amounts around a central frequency in an attempt to achieve carrier lock. In step 360 a determination is made of whether the absolute value of k is greater than a predetermined maximum integer value. Following a NO determination by step 360, a determination is made by step 365 of whether k is greater than zero. A NO determination by step 365 causes k to be set to −k resulting in the end of this processing path. Assuming the dither flag remains true upon the processing of the next frame, this will cause step 355 to utilize a frequency offset of −k*W. A YES determination by step 365 results in setting k=−k+1 for use during the next frame assuming the dither flag remains true; for example if k was previously −1, then it will become k=−(−1)+1=2. A YES determination by step 360 represents that the value of k has reached its maximum predetermined limit causing step 380 to set k=1 and set the dither flag to false. This will signify that carrier lock was not able to be achieved by the dithering frequency offsets and that an attempt to regain carrier lock will be restarted on the next frame using the frequency derived from the header preamble.

Regarding the embodiment of FIG. 3, the PLL frequency is dithered about the header preamble frequency in an attempt to regain frame lock of the PLL with frame timing. If carrier lock is not able to be achieved when the maximum allowed dithering is reached, the process is started over again starting with a header preamble frequency estimate. Once carrier lock is achieved, the loop filter bandwidth of the PLL is incrementally decreased one frame at a time until the nominal loop bandwidth is reached. Meanwhile, the system continues to monitor the error correction decoder to determine if an error free frame of data has occurred. The frequency estimate for the PLL corresponding to an error-free frame of data always takes precedence over any other frequency estimate regardless of whether it came from the header preamble frequency estimate or from the PLL frequency estimate when the lock indicator is true. Once the system has recognized and saved the frequency estimate associated with an error-free frame of data, the system will only fall back to other frequency estimate techniques if the frequency estimate of the error-free frame is considered stale.

Figure 4:
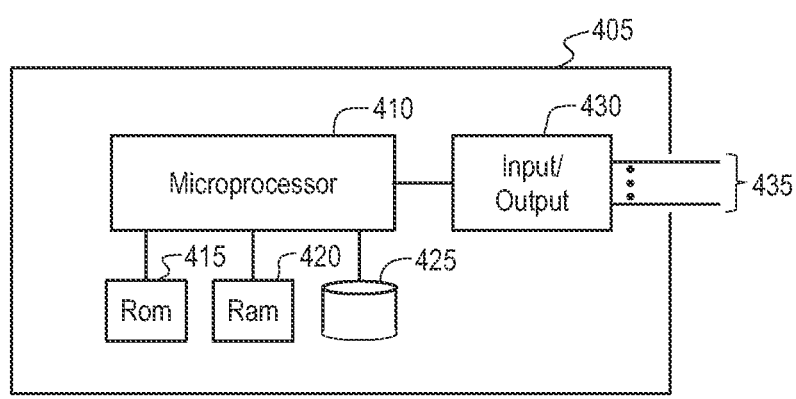
FIG. 4 is a block diagram of an exemplary computing environment for implementing steps in accordance with the methods in accordance with the present invention.

FIG. 4 is a block diagram of an exemplary computing apparatus 405 for implementing the control logic in accordance with the illustrative methods of the present invention, e.g. the Carrier Frequency Estimation Module 175 could be implemented using the computing apparatus 405. A microprocessor 410 operates under the control of stored program instructions to carry out a series of steps, e.g. determining the frequency estimate to be utilized for each frame in accordance with the exemplary methods of the present invention. Read-only memory (ROM) 415 stores the program instructions and predetermined values, and random access memory (RAM) 420 provides a memory resource that supports data being written to and read from the microprocessor 410. A disk drive or other nonvolatile memory 425 provides an alternate source of memory storage also allowing data to be written to and read from the microprocessor 410. An input/output module 430 is connected to microprocessor 410 facilitating the communication of data to and from the microprocessor 410 on data lines 435. Input data to the computing apparatus 405 and output data from the computing apparatus 405 are shown in more detail with regard to the Carrier Frequency Estimation Module 175 of FIG. 1. The threshold values and other predetermined values associated with the exemplary methods are stored in memory of the computing apparatus 405. Additionally, instructions for implementing the counters and control logic associated with the exemplary methods are stored in and executed by the computing apparatus 405. Although user input/output devices (keyboard, mouse, monitor, etc.) are not shown since these are normally not needed or utilized during operation of the computing apparatus 405, it will be understood that such user I/O devices can be coupled by data lines 435 to enter or make changes to stored instructions and/or data stored in memory while the computing apparatus 405 is off-line, i.e. not actively working as part of the Carrier Recovery Circuitry 145.

It will be understood by those skilled in the art that the exemplary computing apparatus 405 represents only one exemplary embodiment of an apparatus for carrying out the functions of the Carrier Frequency Estimation Module 175. One or more custom or programmable integrated circuits with embedded firmware could also be utilized to implement the required functions. Alternatively, a hardwired logical circuit design, contained in a custom integrated circuit or contained in discrete hardware elements, could also be utilized to provide the required functions. While such embodiments lack the flexibility of easily altering control instructions and/or values of stored parameters of the microprocessor-based implementation of the computing apparatus 405, such other implementations have desirable attributes such as faster processing speed and reliability especially under challenging operating environments.

A receiver operating in accordance with the exemplary methods determines a carrier frequency estimate to be used, e.g. by a phase locked loop, to identify each data unit (byte or groups of bytes) in the data from the payload of successive received frames of information. A carrier frequency estimate used for the synchronization of data units in a previous frame that is error free after error correction is stored in memory for the use in a successive number of following frames without regard to other carrier frequency estimates such as derived from the header preamble of associated successive frames until the next frame with all the errors being correctable by the error correction decoder. Upon a predetermined number of successive frames with data having been recovered based on one carrier frequency estimate associated with a last prior frame was decoded without any errors, other techniques for determining a carrier frequency estimate are employed, e.g. carrier frequency estimate derived from the header/preamble of a frame. As used herein, the "predetermined number" of frames means a significant number of frames relative to the rate of frame transmission, e.g. for a geosynchronous satellite where the receiver and the transmitter are moving at the same rate, the carrier offset will stay fixed, so the frequency estimate can be used indefinitely in theory and so the predetermined number could be set very large. However, for a satellite in the low earth orbit where the Doppler rate of change is large, the carrier frequency estimate will become stale within a matter of milliseconds, so the predetermined number will be set much smaller.

The methods in accordance with the present invention represent improvements in the technology of digital data recovery. In accordance with the exemplary methods of the present invention, error correction information associated with data recovered from a previous frame provides an unambiguous determination that the carrier frequency estimate associated with that frame was an objectively good estimate. In accordance with the exemplary methods of the present invention, such an objectively good estimate will continue to be used for a predetermined number of frames.

Although exemplary implementations of the invention have been depicted and described in detail herein, it will be apparent to those skilled in the art that various modifications, additions, substitutions, and the like can be made without departing from the spirit of the invention. For example other forms of frequency/carrier synchronization other than a phase locked loop could be utilized. Although the exemplary methods of the present invention are especially suited for data receivers that must acquire and maintain synchronization of frames with data encoded by adaptable modulation type and/or length received in an environment of less than optimal SNR, receivers for recovering digital data encoded using various types of modulation systems could benefit from the exemplary methods explained herein.

The scope of the invention is defined in the following claims.

The invention claimed is:

1. A method implemented by a radio frequency receiver for synchronizing the recovery of data carried by frames received by a radio frequency communication channel where the frames have been encoded using a variable modulation system by which the amount of data carried by a frame can vary on a frame-to-frame basis, the method comprising the steps of:

determining a first carrier frequency estimate and using the first carrier frequency estimate to establish carrier synchronization with the data to identify each data unit contained in a first frame;

receiving an indication from error correction applied to the identified data units of the first frame of whether all the errors, if any, in the data units within the first frame were correctable, the radio frequency communication channel being subject to changing conditions causing a variation of the signal-to-noise ratio for the received data where the possibility of errors in the received data increases as the signal-to-noise decreases and also increases as the amount of data carried in each frame increases;

if the indication represents that all the errors, if any, were corrected by the error correction, saving the first carrier frequency estimate in memory and using it for synchronization of data contained in a predetermined number of subsequent frames regardless of other carrier frequency information associated with the subsequent frames in which uncorrectable errors are present;

counting the number of frames received; and upon determining for another frame, following the first frame and before reaching the predetermined number of subsequent frames, that the another frame is error free, with the error correction having been applied, saving a carrier frequency estimate associated with the another frame and resetting a count of the number of frames received so that the carrier frequency estimate associated with the another frame will be used for the predetermined number of subsequent frames beginning from the another frame.

2. The method of claim 1 further comprising the steps of:

upon determining that no error free frame with the error correction having been applied is achieved during each frame of the predetermined number of subsequent frames, using a carrier frequency estimate associated with a synchronization preamble of a next frame for synchronization and identification of the data units carried by the next frame.

3. A method implemented by a radio frequency receiver for synchronizing the recovery of data carried by frames received by a radio frequency communication channel where the frames have been encoded using a variable modulation system by which the amount of data carried by a frame can vary on a frame-to-frame basis, the method comprising the steps of:

determining a first carrier frequency estimate and using the first carrier frequency estimate to establish carrier synchronization with the data to identify each data unit contained in a first frame;

receiving an indication from error correction applied to the identified data units of the first frame of whether all the errors, if any, in the data units within the first frame were correctable, the radio frequency communication channel being subject to changing conditions causing a variation of the signal-to-noise ratio for the received data where the possibility of errors in the received data increases as the signal-to-noise decreases and also increases as the amount of data carried in each frame increases;

if the indication represents that all the errors, if any, were corrected by the error correction, saving the first carrier frequency estimate in memory and using it for synchronization of data contained in a predetermined number of subsequent frames regardless of other carrier frequency information associated with the subsequent frames in which uncorrectable errors are present;

the determining step being at least partially implemented by a phase locked loop that includes a loop filter having a controllable bandwidth with a first loop bandwidth utilized while the data is being recovered from frames with no errors with the error correction having been applied;

receiving a frame sync indication representing if frame location is identified; and upon the frame location being identified and that the frame sync indication represents that a frame is not error free after the error correction having been applied during each frame of the predetermined number of subsequent frames, changing the bandwidth of the loop filter from the first loop bandwidth to a larger bandwidth for each successive frame until the occurrence of one of a maximum predetermined loop bandwidth is reached or an error free frame after the error correction being applied is received.

4. A method implemented by a radio frequency receiver for synchronizing the recovery of data carried by frames received by a radio frequency communication channel where the frames have been encoded using a variable modulation system by which the amount of data carried by a frame can vary on a frame-to-frame basis, the method comprising the steps of:

determining a first carrier frequency estimate and using the first carrier frequency estimate to establish carrier synchronization with the data to identify each data unit contained in a first frame;

receiving an indication from error correction applied to the identified data units of the first frame of whether all the errors, if any, in the data units within the first frame were correctable, the radio frequency communication channel being subject to changing conditions causing a variation of the signal-to-noise ratio for the received data where the possibility of errors in the received data increases as the signal-to-noise decreases and also increases as the amount of data carried in each frame increases;

if the indication represents that all the errors, if any, were corrected by the error correction, saving the first carrier frequency estimate in memory and using it for synchronization of data contained in a predetermined number of subsequent frames regardless of other carrier frequency information associated with the subsequent frames in which uncorrectable errors are present;

receiving a frame sync indication of the frame location and that no error free frames occurred during each frame of the predetermined number of subsequent frames;

comparing a phase detector error variance with an error variance threshold;

determining if the phase detector error variance is above the error variance threshold; and upon determining that the phase detector error variance is above the error variance threshold, calculating another carrier frequency estimate derived from a header preamble of a frame following the predetermined number of subsequent frames and offsetting from the another carrier frequency estimate by alternating plus and minus increasing amounts of frequency offset for successive frames until either the phase detector error variance is smaller than the error variance threshold or an error free frame with the error correction being applied occurs.

5. A method implemented by a radio frequency receiver for synchronizing the recovery of data carried by frames received by a radio frequency communication, the method comprising the steps of:

determining a first carrier frequency estimate and using the first carrier frequency estimate to establish synchronization with the data to identify each data unit contained in a first frame;

receiving an indication from error correction applied to the identified data units of the first frame of whether the data units in the first frame are error free after the error correction has been applied;

if the indication represents that all data unit errors within the first frame were corrected by the error correction, saving the first carrier frequency estimate in memory and using the first carrier frequency estimate for synchronization of data contained in a predetermined number of subsequent frames regardless of other carrier frequency information associated with the subsequent frames in which uncorrectable errors are present;

counting the number of frames received; and upon determining for another frame following the first frame and before reaching the predetermined number of subsequent frames that the another frame is error free after the error correction, saving a carrier frequency estimate associated with the another frame and resetting a count of the number of frames received so that the carrier frequency estimate associated with the another frame will be used for the predetermined number of subsequent frames beginning from the another frame.

6. The method of claim 5 further comprising the steps of:

upon determining that the indication represents that no frame was free of data unit errors after the error correction being applied during each frame of the predetermined number of subsequent frames, using a carrier frequency estimate associated with a synchronization preamble of a next frame following the predetermined number of subsequent frames for synchronization and identification of the data units carried by the next frame.

7. A method implemented by a radio frequency receiver for synchronizing the recovery of data carried by frames received by a radio frequency communication, the method comprising the steps of:

determining a first carrier frequency estimate and using the first carrier frequency estimate to establish synchronization with the data to identify each data unit contained in a first frame;

receiving an indication from error correction applied to the identified data units of the first frame of whether the data units in the first frame are error free after the error correction has been applied;

if the indication represents that all data unit errors within the first frame were corrected by the error correction, saving the first carrier frequency estimate in memory and using the first carrier frequency estimate for synchronization of data contained in a predetermined number of subsequent frames regardless of other carrier frequency information associated with the subsequent frames in which uncorrectable errors are present;

the determining step being at least partially implemented by a phase locked loop that includes a loop filter having a controllable bandwidth with a first loop bandwidth utilized while the data is being recovered with no errors requiring correction;

receiving a frame sync indication of frame location being identified; and upon determining that the frame location is identified and that not all errors were correctable by the error correction being applied during each frame of the predetermined number of subsequent frames, changing the bandwidth of the loop filter from the first loop bandwidth to a larger bandwidth for each successive frame until the occurrence of one of a maximum predetermined loop bandwidth is reached or an error free frame after the error correction is received.

8. A method implemented by a radio frequency receiver for synchronizing the recovery of data carried by frames received by a radio frequency communication, the method comprising the steps of:

determining a first carrier frequency estimate and using the first carrier frequency estimate to establish synchronization with the data to identify each data unit contained in a first frame;

receiving an indication from error correction applied to the identified data units of the first frame of whether the data units in the first frame are error free after the error correction has been applied;

if the indication represents that all data unit errors within the first frame were corrected by the error correction, saving the first carrier frequency estimate in memory and using the first carrier frequency estimate for synchronization of data contained in a predetermined number of subsequent frames regardless of other carrier frequency information associated with the subsequent frames in which uncorrectable errors are present;

receiving a frame sync indication of frame location being identified; and upon determining that no frame free of data unit errors with the error correction being applied was received during each frame of the predetermined number of frames, using another carrier frequency estimate derived from a header preamble of a frame following the predetermined number of subsequent frames and offsetting from the another carrier frequency estimate by alternating plus and minus increasing amounts of frequency offset for successive frames until either a phase detector error variance is smaller than an error variance threshold or an error free frame with the error correction being applied occurs.

9. A radio frequency receiver that recovers data received in frames over a radio frequency communication channel wherein synchronization with data units within the data is required to identify the data units prior to the recovery of the information represented by the data units, the receiver comprising:

a carrier recovery device that generates a first carrier frequency estimate that is used to establish synchronization with the data units and identifies the data units contained in a first frame;

a memory for storing values;

a counter having a predefined threshold value;

an error correction device coupled to the carrier recovery device that uses an error correction code that determines for the data units in a frame if all the errors, if any, within the frame are correctable, the error correction device sending an error occurrence indication to the carrier recovery device indicating if an error was determined to exist;

the carrier recovery device, upon receiving an error occurrence indication representing that the first frame was error free after the error correction code was applied, saves the first carrier frequency estimate in the memory, resets the counter to a staring value and sets a good frequency value to indicate a true condition;

the carrier recovery device, for subsequent frames following the first frame, upon determining that the good frequency value is true, increments the value of the counter and upon determining that the value of the counter is less than a predefined threshold value, uses the first carrier frequency estimate saved in the memory for synchronization of data units for the subsequent frames regardless of other carrier frequency information associated with the subsequent frames in which uncorrectable errors are present;

the carrier recovery device, for a further subsequent frame, upon determining that the value of the counter equals the predefined threshold value, sets the good frequency value to represent false and causes another carrier frequency estimate derived from a header preamble of the further subsequent frame to be stored in the memory to be used for synchronization of the data units in a next received frame;

the carrier recovery device including a phase locked loop that includes a loop filter having a controllable bandwidth with a first bandwidth utilized while all errors within the received frames are corrected by the error correction code;

a frame location is received by the carrier recovery device indicating the frame boundary;

the carrier recovery device setting the good frequency value to represent false upon the counter reaching the predefined threshold value; and upon the carrier recovery device determining for one of the subsequent frames that synchronization exists based on the good frequency value being false, the carrier recovery device changing the bandwidth of the loop filter from its existing bandwidth to a larger bandwidth for each successive frame following the one of the subsequent frames until an error free frame after the error correction code was applied, is received, upon the loop bandwidth being increased to a maximum predetermined bandwidth value, where no further bandwidth increases are made.

10. A radio frequency receiver that recovers data received in frames over a radio frequency communication channel wherein synchronization with data units within the data is required to identify the data units prior to the recovery of the information represented by the data units, the receiver comprising:

a carrier recovery device that generates a first carrier frequency estimate that is used to establish synchronization with the data units and identifies the data units contained in a first frame;

a memory for storing values;

a counter having a predefined threshold value;

an error correction device coupled to the carrier recovery device that uses an error correction code that determines for the data units in a frame if all the errors, if any, within the frame are correctable, the error correction device sending an error occurrence indication to the carrier recovery device indicating if an error was determined to exist;

the carrier recovery device, upon receiving an error occurrence indication representing that the first frame was error free after the error correction code was applied, saves the first carrier frequency estimate in the memory, resets the counter to a staring value and sets a good frequency value to indicate a true condition;

the carrier recovery device, for subsequent frames following the first frame, upon determining that the good frequency value is true, increments the value of the counter and upon determining that the value of the counter is less than a predefined threshold value, uses the first carrier frequency estimate saved in the memory for synchronization of data units for the subsequent frames regardless of other carrier frequency information associated with the subsequent frames in which uncorrectable errors are present;

the carrier recovery device, for a further subsequent frame, upon determining that the value of the counter equals the predefined threshold value, sets the good frequency value to represent false and causes another carrier frequency estimate derived from a header preamble of the further subsequent frame to be stored in the memory to be used for synchronization of the data units in a next received frame;

the carrier recovery device including a phase locked loop that includes a loop filter having a controllable bandwidth with a first bandwidth utilized while there is an error free frame after the application of the error correction code;

a frame sync is received by the carrier recovery device indicating that frame location is known;

the carrier recovery device setting the good frequency value to represent false upon the counter reaching the predefined threshold value; and the carrier recovery device applying a frequency offset to the another carrier frequency estimate by alternating plus and minus increasing amounts of frequency offset in successive frames following one of the subsequent frames until a correct carrier frequency is recovered.

* * * * *